US010926761B2

(12) United States Patent
Choi et al.

(10) Patent No.: US 10,926,761 B2
(45) Date of Patent: Feb. 23, 2021

(54) VEHICLE AND METHOD FOR CONTROLLING THE SAME

(71) Applicants: Hyundai Motor Company, Seoul (KR); Kia Motors Corporation, Seoul (KR)

(72) Inventors: Jaewoong Choi, Seoul (KR); TaeYoung Lee, Gyeonggi-do (KR); Yonjun Jang, Gyeongsangnam-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 217 days.

(21) Appl. No.: 16/205,648

(22) Filed: Nov. 30, 2018

(65) Prior Publication Data
US 2020/0079365 A1 Mar. 12, 2020

(30) Foreign Application Priority Data

Sep. 11, 2018 (KR) .......................... 10-2018-0108293

(51) Int. Cl.
*B60W 30/09* (2012.01)
*B60W 10/20* (2006.01)
*B60W 10/184* (2012.01)

(52) U.S. Cl.
CPC .......... *B60W 30/09* (2013.01); *B60W 10/184* (2013.01); *B60W 10/20* (2013.01); *B60W 2400/00* (2013.01); *B60W 2520/10* (2013.01); *B60W 2520/14* (2013.01); *B60W 2540/18* (2013.01); *B60W 2554/00* (2020.02); *B60W 2710/182* (2013.01); *B60W 2710/20* (2013.01)

(58) Field of Classification Search
CPC .... B60W 30/09; B60W 10/20; B60W 10/184; B60W 2400/00; B60W 2550/10; B60T 2230/02; B60T 2250/03
USPC ......................................................... 701/41
See application file for complete search history.

(56) References Cited

U.S. PATENT DOCUMENTS

| 6,488,109 | B1 * | 12/2002 | Igaki | ................... | B60T 8/17557 |
| | | | | | 180/169 |
| 2004/0267427 | A1 * | 12/2004 | Suzuki | ................. | B60T 8/1769 |
| | | | | | 701/69 |
| 2013/0304322 | A1 * | 11/2013 | Isaji | ..................... | B62D 15/025 |
| | | | | | 701/41 |

(Continued)

FOREIGN PATENT DOCUMENTS

KR 10-2017-0067530 6/2017

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

A vehicle and method for controlling the same are provided. The vehicle includes a speed detector that detects driving speed of the vehicle, a detection sensor that obtains information regarding at least one of a position and a speed of an object around the vehicle, and a yaw rate detector that detects a speed at which a rotation angle of the vehicle's frame is changed while the vehicle is driven. A controller then determines a yaw rate required for the vehicle to steer to avoid the object, applies partial braking on an inner wheel of the vehicle based on the determined yaw rate, and applies partial braking on an outer wheel of the vehicle to reduce a beta value of the vehicle obtained during the steering-based avoidance when the beta value exceeds a predetermined value.

14 Claims, 7 Drawing Sheets

(56) References Cited

U.S. PATENT DOCUMENTS

2014/0343816 A1* 11/2014 Onoda ................ B60L 15/2009
                                                                701/70
2016/0347181 A1* 12/2016 Yamakado .............. B60L 15/20
2018/0281763 A1* 10/2018 Ohmori ..................... B60T 7/12

* cited by examiner

VEHICLE AND METHOD FOR CONTROLLING THE SAME

CROSS-REFERENCE TO RELATED APPLICATION

This application is based on and claims priority under 35 U.S.C. § 119 to Korean Patent Application No. 10-2018-0108293 filed on Sep. 11, 2018, the disclosure of which is incorporated herein by reference in its entirety.

BACKGROUND

1. Field of the Invention

The present disclosure relates to a vehicle and method for controlling the same, and more particularly, to a technology for securing the maximum distance between the vehicle and a surrounding object by performing auxiliary yaw rate control and taking into account lateral slip of the vehicle so as to steer to avoid the object.

2. Discussion of Related Art

Vehicles are driven on the roads or tracks to transport people or goods to destinations. A vehicle is able to move to various locations on one or more wheels mounted onto the frame of the vehicle. Such vehicles may be classified into three- or four-wheel vehicles, a two-wheel vehicle such as a motorcycle, construction machinery, bicycles, trains traveling along rails on the tracks, and the like. With the development of automotive technology, there are advantages of vehicles being able to be driver for long distances while also considering traffic conditions.

To relieve burdens and increase convenience of the driver, recent studies regarding vehicles equipped with an advanced driver assist system (ADAS) that actively provides information about a state of the vehicle, a state of the driver, and surrounding conditions are ongoing actively. As examples of the ADAS equipped within the vehicle, there are an autonomous emergency brake (AEB) and an autonomous emergency steering (AES). These systems are collision avoidance systems that determine the risk of a vehicle colliding with other surrounding vehicles t, and apply an emergency brake during a collision or avoid collisions with the other vehicles.

Additionally, drivers may encounter a situation that requires emergency steering of the vehicle to avoid a collision with a vehicle, an object, an animal, etc., each of which is coming into the front view while driving. Recently, many different systems such as electronic controlled suspension (ECS), all-wheel drive (AWD) or full-time four wheel drive, and electronic stability control (ESC) have developed to assist emergency steering and motion stability. Furthermore, more research is required to reduce occurrences of slip of the vehicle during emergency steering for collision avoidance.

SUMMARY

The present disclosure provides a vehicle and method for controlling the same, which performs auxiliary yaw rate control for steering to avoid a nearby object while the vehicle is driven and secures the maximum distance between the vehicle and the object taking into account the lateral slip of the vehicle.

In accordance with an aspect of the present disclosure, a vehicle may include a speed detector configured to detect driving speed of the vehicle; a detection sensor configured to obtain information regarding at least one of position and speed of an object around the vehicle; a yaw rate detector configured to detect a speed at which a rotation angle of the vehicle's frame is changed while the vehicle is driven; and a controller configured to determine a yaw rate required for the vehicle to steer to avoid the object, apply partial braking on an inner wheel of the vehicle based on the determined yaw rate, and apply partial braking on an outer wheel of the vehicle to reduce a beta value of the vehicle obtained during the steering-based avoidance when the beta value exceeds a predetermined value.

The controller may be configured to stop partial braking on the inner wheel of the vehicle when the beta value of the vehicle exceeds the predetermined value, and apply partial braking on the outer wheel of the vehicle to reduce the beta value. The inner wheel of the vehicle may include a wheel of the vehicle positioned at an inner side of a rotation axis around which the vehicle turns to steer to avoid the object, and the outer wheel of the vehicle may include a wheel of the vehicle positioned at an outer side of a rotation axis around which the vehicle turns to steer to avoid the object.

The controller may further be configured to calculate a yaw rate required for the vehicle to steer to avoid the object based on length of the vehicle, width of the vehicle, and coordinates of position of the object, at which a distance between a steering-based avoidance path for the vehicle to steer to avoid the object and the object is minimized. The controller may be configured to determine the coordinates of the position of the object, at which a vertical distance to the steering-based avoidance path is minimized, based on position information of the object obtained by the detection sensor and the steering-based avoidance path of the vehicle.

The vehicle may further include a steering angle detector configured to detect a rotation angle of a steering wheel of the vehicle, and the controller may be configured to calculate a yaw moment required for partial braking on the inner wheel of the vehicle, based on driving speed of the vehicle, a yaw rate required for the vehicle to steer to avoid the object, and a yaw rate determined based on the detected steering angle. The yaw moment required for the partial braking on the inner wheel of the vehicle may correspond to a yaw moment in a steering-based avoidance direction of the vehicle, and the controller may then be configured to apply partial braking on the inner wheel of the vehicle with braking pressure determined based on the calculated yaw moment.

Additionally, the controller may be configured to calculate a yaw moment required for partial braking on the outer wheel of the vehicle based on the driving speed of the vehicle and the beta value of the vehicle. The yaw moment required for the partial braking on the outer wheel of the vehicle may correspond to a yaw moment in a direction opposite the steering-based avoidance direction of the vehicle, and the controller may then be configured to apply partial braking on the outer wheel of the vehicle with braking pressure determined based on the calculated yaw moment. The beta value of the vehicle may comprise a numerical value of an extent to which the vehicle slips in a direction opposite the steering-based avoidance direction during the steering-based avoidance.

In accordance with another aspect of the present disclosure, a method for controlling a vehicle may include obtaining information regarding at least one of position and speed of an object around the vehicle; determining a yaw rate required for the vehicle to steer to avoid the object; applying partial braking on an inner wheel of the vehicle based on the determined yaw rate; and applying partial braking on an outer wheel of the vehicle to reduce a beta value of the vehicle obtained during the steering-based avoidance when the beta value exceeds a predetermined value.

The applying of the partial braking on the outer wheel of the vehicle may include stopping partial braking on the inner wheel of the vehicle when the beta value of the vehicle exceeds the predetermined value and applying partial braking on the outer wheel of the vehicle to reduce the beta value. The determining of the yaw rate required for the vehicle to steer to avoid the object may include calculating a yaw rate required for the vehicle to steer to avoid the object based on length of the vehicle, width of the vehicle, and coordinates of the position of the object, at which a distance between a steering-based avoidance path for the vehicle to steer to avoid the object and the object is minimized.

The method may further include determining the coordinates of the position of the object, at which a vertical distance to the steering-based avoidance path is minimized, based on position information of the object obtained by the detection sensor and the steering-based avoidance path of the vehicle. Additionally, the method may include detecting a rotation angle of a steering wheel of the vehicle, and calculating a yaw moment required for partial braking on the inner wheel of the vehicle, based on driving speed of the vehicle, a yaw rate required for the vehicle to steer to avoid the object, and a yaw rate determined based on the detected steering angle.

The applying of the partial braking on the inner wheel of the vehicle may include applying partial braking on the inner wheel of the vehicle with braking pressure determined based on the calculated yaw moment. In addition, the applying of the partial braking on the outer wheel of the vehicle may include calculating a yaw moment required for partial braking on the outer wheel of the vehicle based on the driving speed of the vehicle and the beta value of the vehicle. The applying of the partial braking on the outer wheel of the vehicle may include applying partial braking on the outer wheel of the vehicle with braking pressure determined based on the calculated yaw moment.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
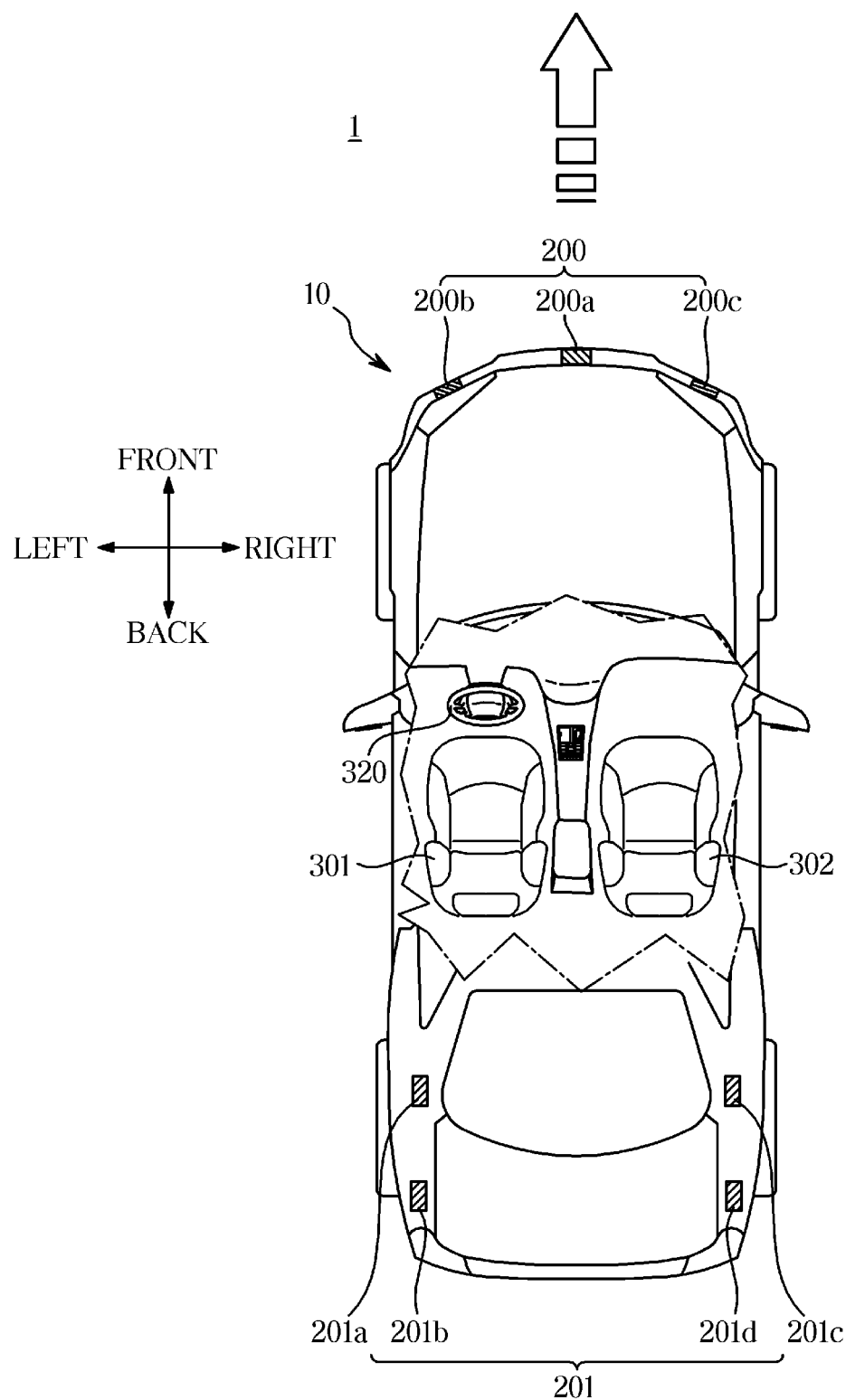
FIG. 1 shows a vehicle equipped with detection sensors and detectors for detecting vehicles behind and to the sides, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of embodiments of the present disclosure will be described, and description of what are commonly known in the art or what overlap each other in the embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Reference numerals used for method steps are just used for convenience of explanation, but not to limit an order of the steps. Thus, unless the context clearly dictates otherwise, the written order may be practiced otherwise. The principle and embodiments of the present invention will now be described with reference to accompanying drawings.

FIG. 1 shows a vehicle equipped with detection sensors and detectors configured to detect vehicles behind and to the sides of a subject vehicle, according to an exemplary embodiment of the present disclosure. For convenience of explanation, a direction in which a vehicle 1 advances (e.g., travels) is referred to as a forward direction, and left and right directions are distinguished based on the forward direction. If the forward direction corresponds to the twelve o'clock position, the right direction is defined to correspond to the three o'clock position or around the three o'clock position, and the left direction is defined to correspond to the nine o'clock position or around the nine o'clock position. The opposite direction of the forward direction is the rear direction. Additionally, a direction down to the floor of the vehicle 1 is referred to as a downward direction, and a direction opposite to the downward direction is referred to as an upward direction. Furthermore, a side located ahead is referred to as a front side, a side located behind is referred to as a rear side, and sides located on either side are referred to as sides. The sides include left and right sides.

Although not shown in FIG. 1, at least one capturer 350 (see FIG. 5) may be provided inside the vehicle 1. The capturer 350 may be a camera, video camera, or the like and may be configured to capture an image around the vehicle 1 while the vehicle is being driven or stopped, and obtain information regarding a type and position of the object. The object captured in the image around the vehicle 1 may include another vehicle (e.g., a surrounding vehicle), pedestrian, bicycle, etc., and may include a moving object or various fixed obstacles.

Figure 5:
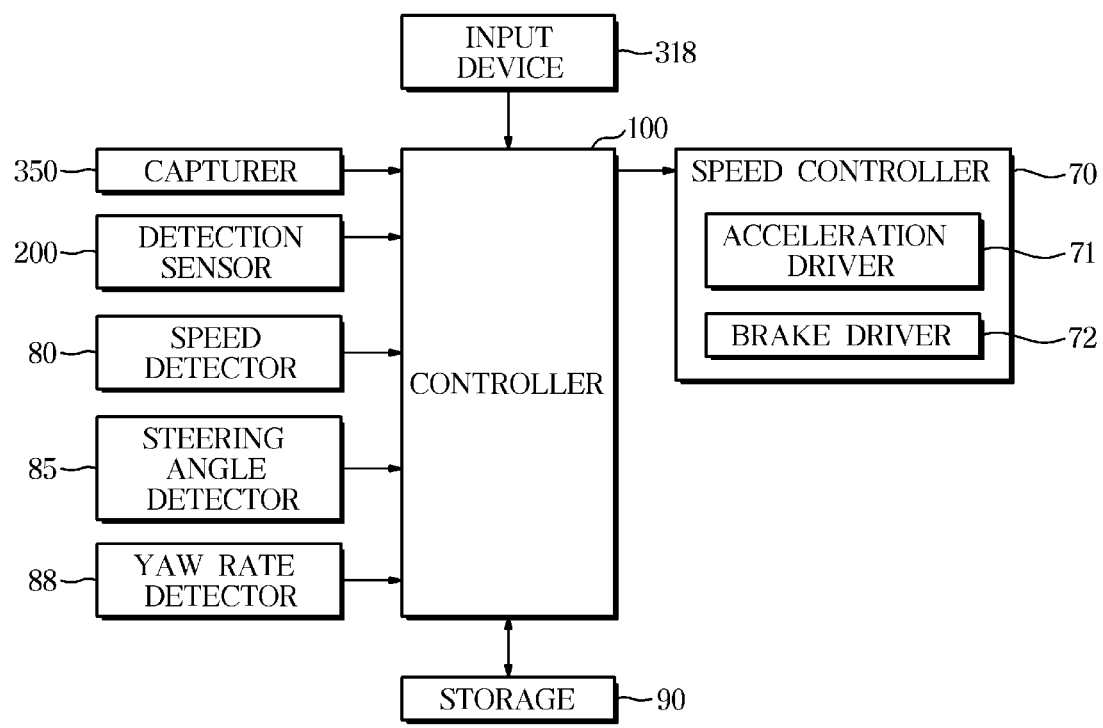
FIG. 5 is a control block diagram of a vehicle, according to an exemplary embodiment of the present disclosure.

The capturer 350 may be configured to detect a type of object around the vehicle 1 by capturing an image of the object and identifying a shape of the captured object through image recognition, and may be configured to transmit the detected information to a controller 100 (see FIG. 5). The capturer 350 may be disposed at any location that allows the capturer 350 to obtain image information by capturing inside or outside of the vehicle 1. The capturer 350 may include at least one camera, and may further include a three dimensional (3D) space recognition sensor, a radar sensor, an ultrasound sensor, etc., to capture a more accurate image.

Referring to FIG. 1, the vehicle 1 may include a detection sensor 200 configured to detect an object located in front of the vehicle 1 to obtain information about at least one of position and moving speed of the object. In an exemplary embodiment, the detection sensor 200 may be configured to obtain information regarding at least one of the position and the speed of the object located around the vehicle 1 with respect to the vehicle 1 (e.g., the subject vehicle). In other words, the detection sensor 200 may be configured to obtain coordinate information in real time, which may vary as the object moves, and detect a distance between the vehicle 1 and the object.

The controller 100 may then be configured to calculate a relative distance and relative speed between the vehicle 1 and the object based on the information regarding position and speed of the object obtained by the detection sensor 200, and calculate time to collision (TTC) of the vehicle 1 with the object based on the calculation result. Furthermore, steering to avoid the object may be adjusted based on the information regarding position and speed of the object obtained by the detection sensor 200.

The detection sensor 200 may be mounted in a position at which an object, e. g., another vehicle, which is located in front, to a side, or to a front side of the vehicle 1 may be recognized, as shown in FIG. 1. In an exemplary embodiment, a plurality of detection sensors 200 may be installed on the front and both sides of the vehicle 1 to recognize all objects located in front of the vehicle 1, in a direction between the left side and front (hereinafter, referred to as 'front-left') of the vehicle 1 and in a direction between the right side and the front (front-right) of the vehicle 1.

For example, a first detection sensor 200a may be installed in a part, e.g., on the inner side, of a radiator grill 6, or may be installed at any location of the vehicle 1 allowing detection of a surrounding vehicle in front of the vehicle 1. In an exemplary embodiment of the present disclosure, it may be assumed that a first detection sensor 200a may be installed at the center of the front surface of the vehicle 1. Furthermore, a second detection sensor 200b may be arranged on a left side of the vehicle 1, and a third detection sensor 200c may be arranged on a right side of the vehicle 1.

The detection sensor 200 may include a rear-and-side detection sensor 201 configured to detect a pedestrian or other vehicle existing or approaching to the rear, side, or in a direction between the side and the rear (hereinafter, referred to as 'rear-side') of the vehicle 1. The rear-side detection sensor 201 (201a to 201d) may be installed in a position at which an object, e. g., other vehicle, located to a side, behind or to the rear-side of the vehicle 1 may be recognized, as shown in FIG. 1.

Further, the detection sensor 200 may be implemented with many different devices, such as a radar using millimeter waves or micro waves, a light detection and ranging (LiDAR) using pulsed laser beams, a vision using visible rays, an infrared sensor using infrared rays, an ultrasound sensor using ultrasounds, and/or the like. The detection sensor 200 may be implemented with any one of them or any combination of them. When a plurality of detection sensors 200 are installed in the vehicle 1, the detection sensors 200 may be implemented with the same type or different types of devices. Additionally, the detection sensors 200 may be implemented with other various devices or combinations of them that may be considered by the designer.

Furthermore, a display may be installed on an upper panel of a dashboard (not shown) of the vehicle 1. The display may be configured to output various information in the form of images to the driver or passenger of the vehicle 1. For example, the display may be configured to visually output various information, such as maps, weather, news, various moving or still images, information regarding status or operation of the vehicle 1, e.g., information regarding the air conditioner, etc. The display may also be configured to provide the driver or passenger with an alert corresponding to a level of danger to the vehicle 1 (e.g., notification regarding a collision risk).

A center fascia (not shown) may be installed in the middle of the dashboard, and may include input devices 318 (318a to 318c) for receiving various instructions related to the vehicle 1. The input devices 318a to 318c may be implemented with mechanical buttons, switches, knobs, a touch pad, a touch screen, a stick-type manipulation device, a trackball, or the like. The driver may control many different operations of the vehicle 1 by manipulating the input devices 318a to 318c.

A control stand and an instrument panel are provided in front of the driver's seat. The control stand may be rotated in a particular direction by manipulation of the driver, and accordingly, the front or back wheels of the vehicle 1 may be rotated, thereby steering the vehicle 1. The control stand may include a spoke linked to a rotational shaft and a steering wheel coupled with the spoke. On the spoke, there may be an input for receiving various instructions, and the input may be implemented with mechanical buttons, switches, knobs, a touch pad, a touch screen, a stick-type manipulation device, a trackball, or the like.

Figure 2:
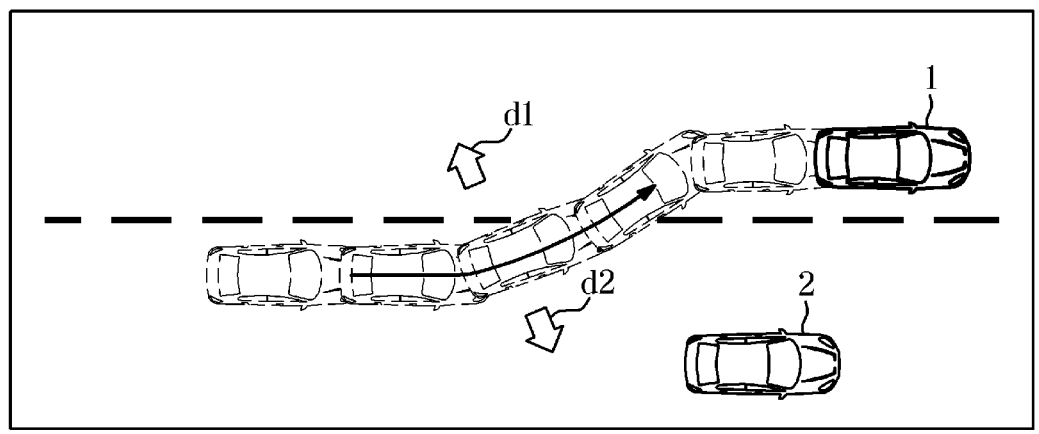
FIG. 2 is a conceptual diagram illustrating how a traveling vehicle avoids a forward object, according to an exemplary embodiment of the present disclosure.
Figure 3:
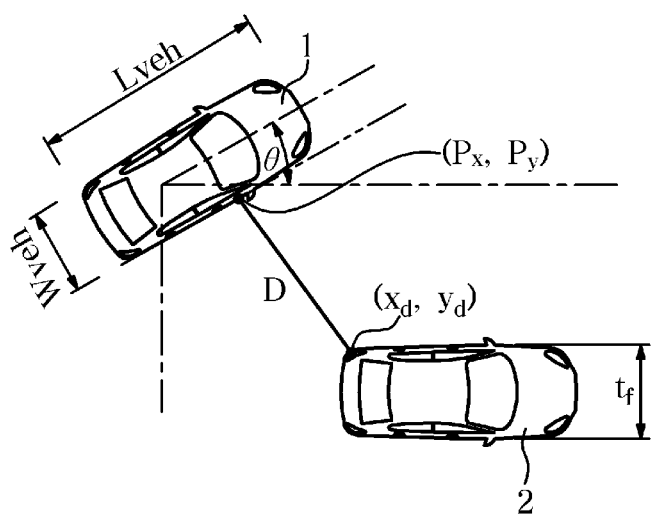
FIG. 3 shows a distance between a vehicle and a forward object when the vehicle avoids the object, according to an exemplary embodiment of the present disclosure.
Figure 4:
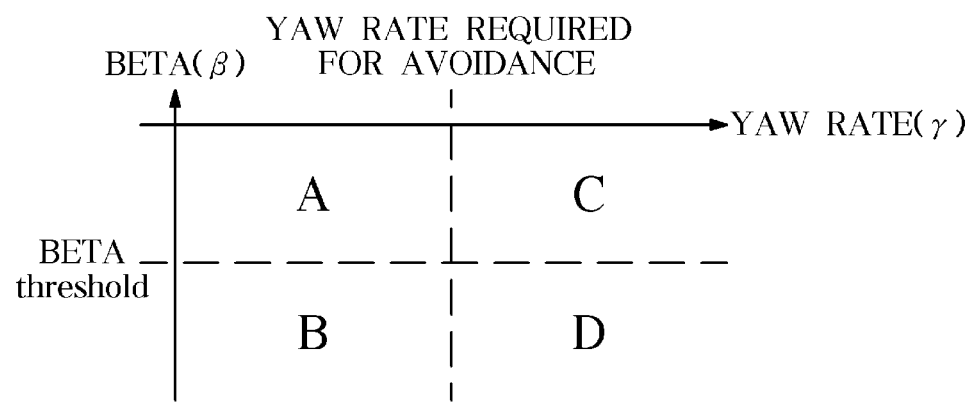
FIG. 4 is a conceptual diagram illustrating a control strategy for an occasion when a vehicle is driven to avoid an object, according to an exemplary embodiment of the present disclosure.

FIG. 2 is a conceptual diagram illustrating how a traveling vehicle avoids an object ahead, according to an exemplary embodiment of the present disclosure, and FIG. 3 shows a distance between a vehicle and an object ahead when the traveling vehicle avoids the object, according to an exemplary embodiment of the present disclosure. FIG. 4 is a conceptual diagram illustrating a control strategy for an occasion when a vehicle is driven to avoid an object, according to an exemplary embodiment of the present disclosure.

Referring to FIG. 2, when there is a risk of collision between the traveling vehicle 1 and an object located around the vehicle 1 (e.g., a surrounding vehicle), the vehicle 1 may be configured to determine a steering-based avoidance path to avoid the possible collision with the object under the operation of the controller 100 and avoid the object by traveling along the determined steering-based avoidance path. Furthermore, the driver of the vehicle 1 may steer the vehicle 1 by manipulating the steering wheel so that the vehicle 1 may avoid the object.

The surrounding object may be any of various things such as a pedestrian, another vehicle, a bicycle, an obstacle, etc., but in the following description, it may be assumed that the object corresponds to a surrounding vehicle 2. When the driver starts steering the vehicle 1, the yaw rate may be produced and the controller 100 may be configured to assist steering-based avoidance of the vehicle 1. In an exemplary embodiment, the controller 100 may include an electronic controlled suspension (ECS) configured to assist avoidance motion of the vehicle 1 and an electronic stability control (ESC) for motion stability of the vehicle 1.

When an avoidance assistance system of the vehicle 1 assists steering-based avoidance performed by driver's manipulation, the system may assist the vehicle 1 in applying partial braking by adjusting individual braking of each wheel. As shown in FIG. 2, when the vehicle 1 (e.g., the subject vehicle) is steered to avoid the other vehicle 2 (e.g., the surrounding vehicle), the avoidance assistance system may assist the vehicle 1 in applying partial braking by operating an inner wheel of the wheels of the vehicle 1. In this regard, the 'inner wheel' of the vehicle 1 refers to a wheel of the vehicle 1 located on the inner side of a rotation axis around which the vehicle 1 turns for steering-based avoidance, and an 'outer wheel' of the vehicle 1 refers to a wheel of the vehicle 1 located on the outer side of the rotation axis.

Referring to FIG. 2, when the vehicle 1 turns to direction d1 to avoid the other vehicle 2 (hereinafter, referred to as 'steering-based avoidance direction'), a wheel of the four wheels of the vehicle 1, which is located in the direction d1, corresponds to the inner wheel, while a wheel located in direction d2, which is opposite the steering-based avoidance direction (hereinafter, referred to as 'direction opposite the steering-based avoidance direction') corresponds to the outer wheel. When the driver steers the vehicle 1 to the direction d1 to avoid the other vehicle 2 ahead, the avoidance assistance system of the vehicle 1 may be configured to execute partial braking of the vehicle 1 by adjusting individual braking operation for the inner wheel of the vehicle 1. In other words, the avoidance assistance system of the vehicle 1 may be configured to secure a yaw rate for steering-based avoidance by performing partial braking on the vehicle 1 based on the driver's intention of steering-based avoidance.

Meanwhile, when assisting steering-based avoidance of the vehicle 1 by applying partial braking by the avoidance assistance system, the lateral slip occurs to the vehicle 1 in the direction d2 opposite the steering-based avoidance direction of the vehicle 1. Specifically, when the vehicle 1 turns to the steering-based avoidance direction d1, the value of the coefficient of beta ($\beta$) (hereinafter, referred to as a 'beta value') increases due to the slip occurring in the direction d2 opposite the steering-based avoidance direction. Due to the beta value increasing in the direction d2 opposite the steering-based avoidance direction of the vehicle 1, the distance between the vehicle 1 and the other vehicle 2 decreases.

As shown in FIG. 3, as the beta value increases due to the slip of the vehicle 1 in the direction d2 opposite the steering-based avoidance direction while the vehicle 1 is steering to avoid the other vehicle 2, distance D between the vehicle 1 and the vehicle 2 decreases. In other words, to assist the driver in adjusting steering to avoid the other vehicle 2, the avoidance assistance system may be configured to assist the steering-based avoidance of the vehicle 1, and the vehicle 1 may slip due to partial braking applied based on the assistance of steering-based avoidance and thus, the distance to the other vehicle 2 decreases. Accordingly, there is a need for securing the distance between the vehicle 1 and an object to be greater than a particular distance by reducing the beta value produced from the slip of the vehicle 1 while securing a yaw rate required for steering-based avoidance by assisting the vehicle 1 in steering to avoid the object.

Referring to FIG. 4, when assisting steering-based avoidance of the vehicle 1, the avoidance assistance system may be configured to secure yaw rate $\gamma$ by applying partial braking on the inner wheel of the vehicle 1, and reduce the beta value produced from the slip of the vehicle 1 by applying partial braking on the outer wheel of the vehicle 1. Referring to the control strategy of the avoidance assistance system as shown in FIG. 4, in region A, the avoidance assistance system may perform control to improve the yaw rate by applying partial braking on the inner wheel of the vehicle 1. Specifically, since the current yaw rate of the vehicle 1 is less than a yaw rate required for steering-based avoidance, the avoidance assistance system may be configured to secure the yaw rate required for steering-based avoidance by applying partial braking on the inner wheel of the vehicle 1 to assist steering-based avoidance when the driver starts steering-based avoidance for the vehicle 1.

Meanwhile, since the vehicle 1 may slip in the direction opposite the steering-based avoidance direction while partial braking is applied on the inner wheel of the vehicle 1, the beta value increases. In region B, the beta value increases to exceed a predetermined reference value, in which case the distance between the vehicle 1 and the other vehicle 2 to avoid is decreased even when the avoidance assistance system applies partial braking on the inner wheel of the vehicle 1, thus causing difficult in avoiding the other vehicle 2.

Furthermore, when the avoidance assistance system applies partial braking on the outer wheel of the vehicle 1 to reduce the beta value, the yaw rate required for steering-based avoidance may not increase, and it may be impossible to steer to avoid the other vehicle 2 as a consequence. In particular, control of assisting steering-based avoidance, which is performed by the avoidance assistance system may thus terminate.

In region C, a yaw rate may be secured more than required for steering-based avoidance of the vehicle 1 and the beta value is less than the predetermined reference value, and thus, a sufficient safety distance for the vehicle 1 to steer to avoid the other vehicle 2 may be secured. In particular, additional control of the avoidance assistance system for the steering-based avoidance of the vehicle 1 is not necessary, and the assistance control for steering-based avoidance by the avoidance assistance system may thus terminate.

In region D, the beta value exceeds the predetermined reference value even though the yaw rate is secured more than required for steering-based avoidance of the vehicle 1. In particular, due to slip of the vehicle 1, the distance to the other vehicle 2 decreases. Accordingly, the avoidance assistance system may control to reduce the beta value, and for this, apply partial braking on the outer wheel of the vehicle 1 to reduce the beta value.

Figure 6:
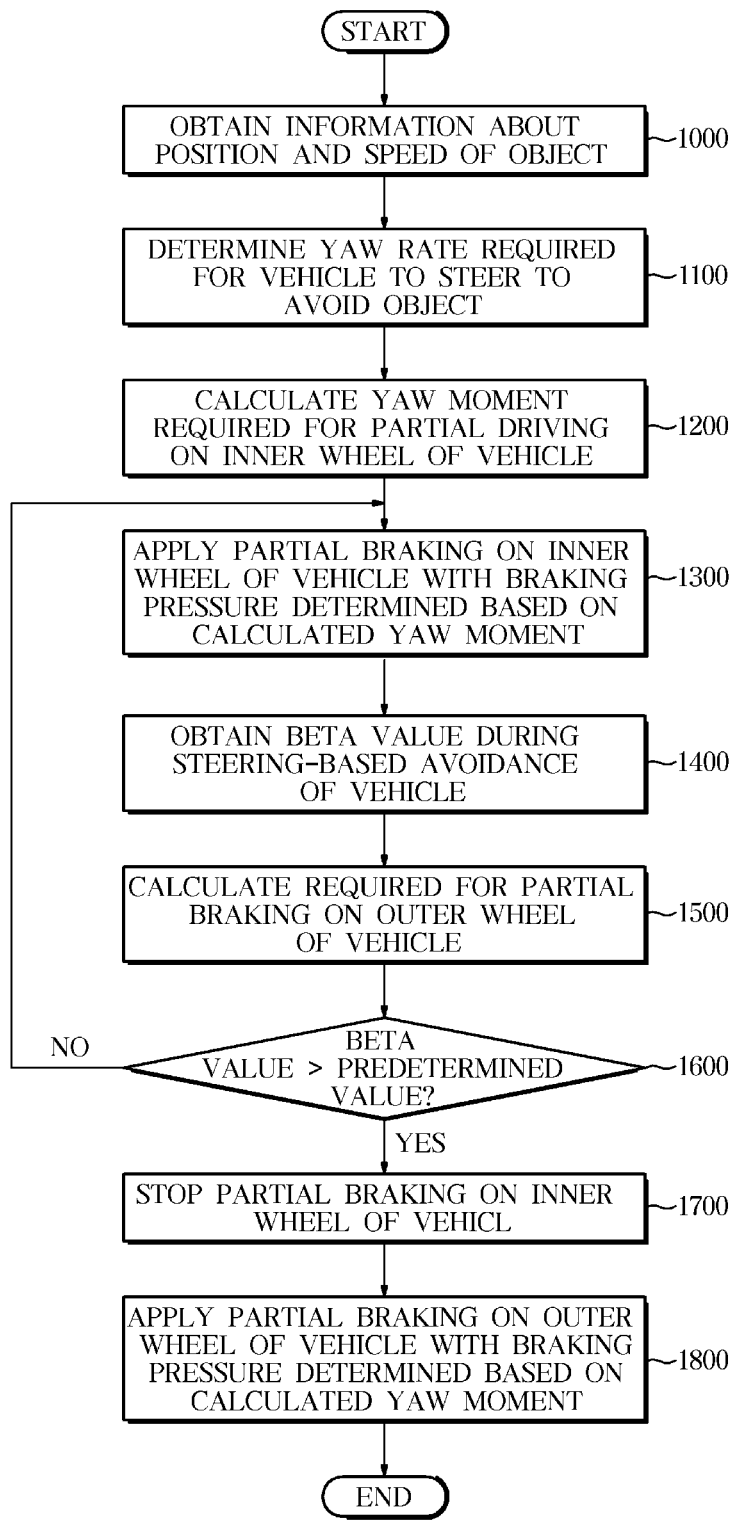
FIG. 6 is a flowchart illustrating a method for controlling a vehicle, according to an exemplary embodiment of the present disclosure.
Figure 7:
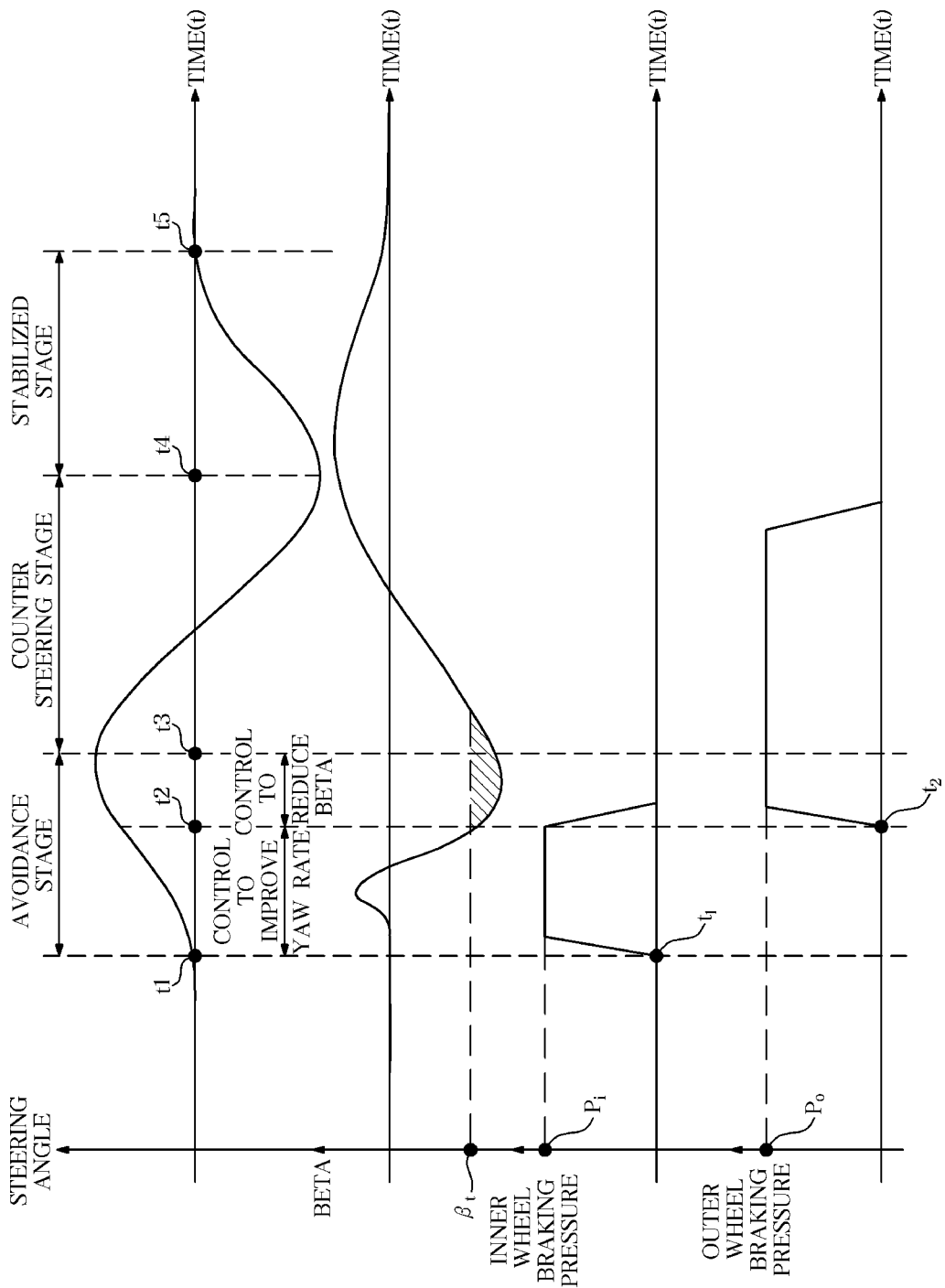
FIG. 7 shows graphs of control flows of a vehicle, according to an exemplary embodiment of the present disclosure.

FIG. 5 is a control block diagram of a vehicle, according to an exemplary embodiment of the present disclosure, and FIG. 6 is a flowchart illustrating a method for controlling a vehicle, according to an exemplary embodiment of the present disclosure. FIG. 7 shows graphs of control flows of a vehicle, according to an exemplary embodiment of the present disclosure.

Referring to FIG. 5, the vehicle 1 in an exemplary embodiment may include a speed controller 70 configured to adjust the driving speed of the vehicle 1 driven by the driver, a speed detector 80 configured to detect the driving speed of the vehicle 1, a steering angle detector 85 configured to detect a rotation angle of the steering wheel 322, a yaw rate detector 88 configured to detect a speed at which the rotation angle of the vehicle body is changed, a storage 90 configured to store data related to control of the vehicle 1, and the controller 100 configured to operate the respective components of the vehicle 1 and adjust the driving speed of the vehicle 1.

Particularly, the speed controller 70 may be configured to adjust the speed of the vehicle 1. The speed controller 70 may include an accelerator driver 71 and a brake driver 72. The accelerator driver 71 may be configured to increase speed of the vehicle 1 by activating the accelerator upon reception of a control signal from the controller 100, and the brake driver 72 may be configured to reduce speed of the vehicle by activating the brake upon reception of a control signal from the controller 100.

The controller 100 may be configured to increase or decrease the driving speed of the vehicle 1 to increase or decrease the distance between the vehicle 1 and an object based on the distance between the vehicle 1 and the object and a predetermined reference distance stored in the storage 90. The controller 100 may also be configured to calculate time to collision (TTC) of the vehicle 1 with the object based on relative distance and relative speed between the vehicle 1 and the object, and may be configured to transmit a signal to adjust the driving speed of the vehicle 1 to the speed controller 70 based on the calculated TTC.

The controller 100 may also be configured to apply partial braking on the inner wheel or the outer wheel of the vehicle 1 by operating the brake driver 72. For example, the controller 100 may be configured to perform control such that steering-based avoidance is assisted by partial braking when the vehicle 1 is steered to avoid the object. The speed controller 70 may be configured to adjust the driving speed of the vehicle 1 under the operation of the controller 100, and decrease the driving speed of the vehicle 1 when the risk of collision between the vehicle 1 and an object is high.

Further, the speed controller 80 may be configured to detect the driving speed of the vehicle 1 under the operation of the controller 100. Specifically, the speed controller 80 may be configured to detect the driving speed using the rotation speed of the wheels of the vehicle 1, and a unit of the driving speed may be represented in kph, meaning a distance (km) traveled per unit hour (h). The steering angle detector 85 may be configured to detect a steering angle, which is a rotation angle of the steering wheel while the vehicle 1 is driven, and the yaw rate detector 88 may be configured to detect the speed at which the rotation angle of the vehicle frame is changed while the vehicle 1 is driven.

The controller 100 may then be configured to obtain slip information of the vehicle 1 based on the detected steering angle and yaw rate. Specifically, the controller 100 may be configured to receive yaw rates detected at regular intervals, average the detected yaw rates, obtain a turning angle by dividing the average of the yaw rates by particular time, and compare the angle of the steering wheel corresponding to the steering wheel information and the turning angle to obtain a difference between the angle of the steering wheel and the turning angle.

When the driver starts steering the vehicle 1 to avoid a forward object while driving the vehicle 1 by manipulating the steering wheel, the steering angle detector 85 may be configured to obtain and transmit the steering angle information of the steering wheel to the controller 100 and the yaw rate detector 88 may be configured to obtain and transmit the raw rate information of the vehicle 1 t the controller 100. The storage 90 may then be configured to store various data related to operation of the vehicle 1. Specifically, in an exemplary embodiment, the storage 90 may be configured to store information regarding driving speed, traveled distance, and traveled time of the vehicle 1, and further store information regarding a type and position of an object detected by the capturer 350.

Additionally, the storage 90 may be configured to store information regarding a position and speed of an object detected by the detection sensor 200, coordinate information of a moving object, which varies in real time, and information regarding a relative distance and relative speed between the vehicle 1 and an object. The storage 90 may be configured to store data related to mathematical formulas and control algorithms used in operating the vehicle 1 in an exemplary embodiment. The controller 1 may be configured to transmit control signals to operate the vehicle 1 according to the formulas and control algorithms.

The storage 90 may further be configured to store information regarding the steering-based avoidance path established for the vehicle 1 to avoid a collision with an object located in front of the vehicle 1, information regarding the rotation angle of the steering wheel obtained by the steering angle detector 85, and information regarding the yaw rate detected by the yaw rate detector 88. Moreover, the storage 90 may be configured to store information regarding the beta value produced when the vehicle 1 is steered to avoid the object, and information regarding a reference for the beta value for switching to partial braking on the outer wheel of the vehicle 1.

The storage 90 may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto. The storage 90 may be a memory implemented with a chip separate from the aforementioned processor in relation to the controller 100, or may be implemented integrally with the processor in a single chip.

Referring to FIG. 6, in a method for controlling a vehicle in accordance with an exemplary embodiment of the present disclosure, the capturer 350 may be configured to capture an object located around the vehicle 1 while the vehicle 1 is driven, and the detection sensor 200 may be configured to detect the object around the vehicle 1 and obtain information regarding at least one of position and speed of the object, in 1000. For example, the detection sensor 200 may be configured to obtain the position information and speed information of the other vehicle 2 in real time when the other vehicle 2 is located ahead of the subject vehicle 1. As described above in connection with FIG. 1, when the other vehicle 2 is traveling ahead of the subject vehicle 1, the driver of the subject vehicle 1 may perform steering-based avoidance against the other vehicle 2 by manipulating the steering wheel of the vehicle 1.

Referring to FIG. 7, when the vehicle 1 is steered to avoid an object, steering-based avoidance control area of the vehicle 1 may be divided into 'avoidance stage', 'counter-steering stage', and 'stabilized phase'. In the avoidance stage, the vehicle 1 may be steered to avoid a collision with the object; in the counter steering stage, the vehicle 1 may be steered to a direction opposite the steering-based avoidance direction to be driven back to an original driving path after avoiding the object; in the stabilized stage, the vehicle 1 may be steered to be driven straight in an original driving path.

The avoidance assistance system of the vehicle 1 may be configured to determine a yaw rate required for the vehicle 1 to steer to avoid the other vehicle 2, under the control of the controller 100, in 1100. For example, the controller 100 may be configured to assist controlling to improve a yaw rate of the vehicle 1 by applying partial braking on the inner wheel of the vehicle 1 for the vehicle 1 to effectively steer to avoid the other vehicle 2 based on the driver's steering-based avoidance control.

Specifically, as shown in FIG. 3, the controller 100 may be configured to calculate a yaw rate γ required for the vehicle 1 to steer to avoid the other vehicle 2 based on length $L_{veh}$ of the vehicle 1, width $w_{veh}$ of the vehicle 1, and coordinates $(x_d, y_d)$ of the position of the other vehicle 2 at which the distance between the steering-based avoidance path for the vehicle 1 to avoid the other vehicle 2 and the other vehicle 2 is minimized, in the following equation (1):

$$\gamma_{des} = \frac{2v_x\left(\frac{1}{2}w_{veh} + y_d\right)}{x_d^2 + y_d^2 + \frac{1}{4}L_{veh}^2 + \frac{1}{4}w_{veh}^2 - 4L_{veh}x_d + 4w_{veh}y_i} \quad (1)$$

wherein $\gamma_{des}$ denotes the yaw rate required for the vehicle 1 to steer to avoid the other vehicle 2, and $(x_d, y_d)$ denotes a point of the other vehicle 2 connected to a point $(P_x, P_y)$ in the steering-based avoidance path, at which the distance between the steering-based avoidance path for the vehicle 1 to avoid the other vehicle 2 and the other vehicle 2 is minimized, as shown in FIG. 3.

The controller 100 may be configured to determine the coordinates $(x_d, y_d)$ of the position of the other vehicle 2 at which a vertical distance from the point $(P_x, P_y)$ on the steering-based avoidance path of the vehicle 1 is minimized, based on the position information of the other vehicle 2 acquired by the detection sensor 200 and the steering-based avoidance path of the vehicle 1. When the vehicle 1 is steered to avoid the other vehicle 2, the distance D between the vehicle 1 and the other vehicle 2 should be secured enough so that the steering-based avoidance may be executed without a collision between the vehicle 1 and the other vehicle 2.

Additionally, the controller 100 may be configured to assist the vehicle 1 with the steering-based avoidance by applying partial braking on the inner wheel of the vehicle 1 based on the calculated yaw rate. Specifically, the controller 100 may be configured to calculate a yaw moment required for partial braking on the inner wheel of the vehicle 1 based on the yaw rate determined based on driving speed $v_x$ of the vehicle 1, the yaw rate $\gamma_{des}$ required for the vehicle 1 to steer to avoid the other vehicle 2, and a yaw rate determined based on the steering angle of the vehicle 1 obtained by the steering angle detector 85, in 1200.

The controller 100 may be configured to calculate the yaw moment required for partial braking on the inner wheel of the vehicle 1 based on the following equation (2):

$$M_z = f_1(v_x, \gamma, \gamma_{des} - g(\delta)) \quad (2)$$

wherein $M_z$ is a moment in the direction of a yaw rate produced in the steering-based avoidance direction of the vehicle 1 during the partial braking on the inner wheel of the vehicle 1. γ Is a current yaw rate of the vehicle 1, and $g(\delta)$ is an expected yaw rate by current steering of the vehicle 1.

The controller 100 may then be configured to apply partial braking on the inner wheel of the vehicle 1 with braking pressure $P_i$ determined based on the calculated yaw moment, in 1300. The controller 100 may be configured to assist the vehicle 1 with the steering-based avoidance by operating the brake driver 72 to apply partial braking on the inner wheel of the vehicle 1. In this regard, as the difference between the yaw rate $\gamma_{des}$ required for steering-based avoidance of the vehicle 1 and the expected yaw rate $g(\delta)$ by current steering of the vehicle 1 increases, the controller 100 may be configured to apply partial braking on the inner wheel of the vehicle 1 with greater braking pressure.

Referring to FIG. 7, in a period from t1 to t2, the controller 100 may be configured to assist the vehicle 1 with steering-based avoidance by applying partial braking on the inner wheel of the vehicle 1. Specifically, the controller 100 may be configured to execute partial braking for the inner wheel of the vehicle 1 with the braking pressure Pi determined based on the calculated yaw moment for a particular period of time from t1. Meanwhile, while the partial braking is applied on the inner wheel to assist steering-based avoidance of the vehicle 1, the vehicle 1 may slip to a direction opposite the steering-based avoidance direction and thus the beta value may increase in the direction opposite the steering-based avoidance direction.

The controller 100 may be configured to obtain information regarding the beta value that changes during the steering-based avoidance of the vehicle 1, in 1400. The controller 100 may be configured to calculate a yaw moment required for partial braking on the outer wheel of the vehicle 1 based on the driving speed $v_x$ of the vehicle 1 and the obtained beta value β of the vehicle 1, in 1500. For example, the controller 100 may be configured to calculate the yaw moment required for partial braking on the outer wheel of the vehicle 1 based on the following equation (3):

$$M_z = f_2(v_x, \beta) \tag{3}$$

wherein $M_z$ is a moment in the direction of yaw rate produced in the direction opposite the steering-based avoidance direction of the vehicle 1 while partial braking on the outer wheel of the vehicle 1 is performed.

Additionally, the controller 100 may be configured to calculate braking pressure $P_o$ required to apply partial braking on the outer wheel based on the calculated yaw moment. The controller 100 may then be configured to compare the beta value of the vehicle 1 obtained during steering-based avoidance of the vehicle 1 with a predetermined threshold, in 1600. When the beta value of the vehicle 1 exceeds the threshold, the controller 100 may be configured to stop partial braking on the inner wheel of the vehicle 1 in 1700, and apply partial braking on the outer wheel of the vehicle 1 with the braking pressure determined based on the calculated yaw moment in 1800.

Referring to FIG. 7, after the vehicle 1 starts assistance control for steering-based avoidance at time t1, the beta value of the vehicle 1 increases in a direction opposite the steering-based avoidance direction and exceeds predetermined threshold $β_t$ at time t2. When the beta value of the vehicle 1 exceeds the predetermined threshold, the vehicle 1 is likely to collide with the other vehicle 2 due to occurrence of slip of the vehicle 1 even while the vehicle 1 is steering to avoid the other vehicle 2.

The predetermined threshold of the beta value may be set in advance based on distance between a point on the steering-based avoidance path of the vehicle 1 and the other vehicle 2, and stored in the storage 90. The controller 100 may be configured to apply partial braking on the outer wheel of the vehicle 1 with the braking pressure $P_0$ determined based on the yaw moment as calculated above, from time t2, at which the beta value obtained during steering-based avoidance of the vehicle 1 exceeds a predetermined value. When the beta value of the vehicle 1 exceeds the predetermined value, the controller 100 may be configured to stop partial braking on the inner wheel of the vehicle 1 and reduce the beta value by applying partial braking on the outer wheel of the vehicle 1.

As shown in FIG. 7, once the partial braking on the outer wheel of the vehicle 1 is started, the beta value of the vehicle 1 decreases, preventing the distance to the other vehicle 2 from being decreasing due to occurrence of slip of the vehicle 1 in a direction opposite the steering-based avoidance direction during the steering-based avoidance of the vehicle 1.

According to an exemplary embodiment of the present disclosure, the vehicle 1 and method for controlling the same may start steering-based avoidance by the driver of the vehicle 1 manipulating the steering wheel when there is a risk of collision between the vehicle 1 and the other vehicle 2. The controller 100 may be configured to determine a yaw rate required for the vehicle 1 to steer to avoid an object, calculate a yaw moment required for partial braking on the inner wheel of the vehicle 1 based on the determined yaw rate, and assist the vehicle 1 in steering to avoid the object by executing partial braking on the inner wheel of the vehicle 1 with braking pressure determined based on the calculated yaw moment.

The controller 100 may be configured to obtain information regarding the beta value produced in a direction opposite the steering-based avoidance direction during steering-based avoidance of the vehicle 1, and compare the beta value with a threshold stored in advance. The controller 100 may be configured to calculate a yaw moment required for partial braking on the outer wheel of the vehicle 1 during the steering-based avoidance of the vehicle 1. When the beta value of the vehicle 1 exceeds the predetermined beta value, the controller 100 may be configured to reduce the beta value of the vehicle 1 by adjusting partial braking on the outer wheel of the vehicle 1 with braking pressure determined based on the calculated yaw moment.

Specifically, the controller 100 may be configured to stop partial braking on the inner wheel of the vehicle 1 that has thus far been performed to assist the steering-based avoidance of the vehicle 1 and start applying partial braking on the outer wheel of the vehicle 1, thereby reducing the beta value produced in the direction opposite the steering-based avoidance direction to secure a distance between the vehicle 1 and an object while assisting the steering-based avoidance of the vehicle 1.

According to an exemplary embodiment of the present disclosure, a vehicle and method for controlling the same has the benefit of effectively steering to avoid a nearby object by performing auxiliary yaw rate control to steer to avoid the object. Apart from the steering-based avoidance, the vehicle and method for controlling the same has another benefit of securing the maximum distance between the vehicle and the object by taking into account the lateral slip of the vehicle.

Meanwhile, the exemplary embodiments of the present disclosure may be implemented in the form of recording media for storing instructions to be executed by a computer. The instructions may be stored in the form of program codes, and when executed by a processor, may generate program modules to perform operation in the embodiments of the present disclosure. The recording media may correspond to non-transitory computer-readable recording media. The non-transitory computer-readable recording medium includes any type of recording medium having data stored thereon that may be thereafter read by a computer. For example, it may be a ROM, a RAM, a magnetic tape, a magnetic disk, a flash memory, an optical data storage device, etc.

Several exemplary embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle, comprising:
a speed detector configured to detect driving speed of the vehicle;

a detection sensor configured to obtain information regarding at least one of a position and a speed of an object around the vehicle;

a steering angle detector configured to detect a rotation angle of a steering wheel of the vehicle;

a yaw rate detector configured to detect a yaw rate of the vehicle's frame; and a controller configured to:

determine a yaw rate required for the vehicle to steer to avoid the object;

when generation of the determined yaw rate is impossible, obtain a yaw moment required for partial braking on an inner wheel of the vehicle based on the driving speed of the vehicle, the yaw rate detected by the yaw rate detector, the determined yaw rate, and a yaw rate determined based on the detected steering angle;

apply partial braking on the inner wheel of the vehicle based on the obtained yaw moment required for partial braking on the inner wheel;

when generation of the determined yaw rate is possible and a beta value of the vehicle obtained during the steering-based avoidance exceeds a predetermined value, obtain a yaw moment required for partial braking on an outer wheel of the vehicle based on the driving speed of the vehicle and the obtained beta value; and apply partial braking on the outer wheel of the vehicle based on the yaw moment required for partial braking on the outer wheel of the vehicle to reduce the beta value of the vehicle.

2. The vehicle of claim 1, wherein the controller is configured to stop partial braking on the inner wheel of the vehicle when the beta value of the vehicle exceeds the predetermined value.

3. The vehicle of claim 1, wherein the inner wheel of the vehicle includes a wheel of the vehicle positioned at an inner side of a rotation axis around which the vehicle turns to steer to avoid the object, and the outer wheel of the vehicle includes a wheel of the vehicle positioned at an outer side of a rotation axis around which the vehicle turns to steer to avoid the object.

4. The vehicle of claim 1, wherein the controller is configured to obtain the yaw rate required for the vehicle to steer to avoid the object based on length of the vehicle, width of the vehicle, and coordinates of position of the object, at which a distance between a steering-based avoidance path for the vehicle to steer to avoid the object and the object is minimized.

5. The vehicle of claim 4, wherein the controller is configured to determine the coordinates of the position of the object, at which a vertical distance to the steering-based avoidance path is minimized, based on position information of the object obtained by the detection sensor and the steering-based avoidance path of the vehicle.

6. The vehicle of claim 1, wherein the yaw moment required for the partial braking on the inner wheel of the vehicle corresponds to a yaw moment in a steering-based avoidance direction of the vehicle, and the controller is configured to apply partial braking on the inner wheel of the vehicle with braking pressure determined based on the calculated yaw moment.

7. The vehicle of claim 1, wherein the yaw moment required for the partial braking on the outer wheel of the vehicle corresponds to a yaw moment in a direction opposite the steering-based avoidance direction of the vehicle, and the controller is configured to apply partial braking on the outer wheel of the vehicle with braking pressure determined based on the calculated yaw moment.

8. The vehicle of claim 1, wherein the beta value of the vehicle includes a numerical value of an extent to which the vehicle slips in a direction opposite the steering-based avoidance direction during the steering-based avoidance.

9. A method for controlling a vehicle, comprising:

obtaining, by a controller, information regarding at least one of a position and a speed of an object around the vehicle;

determining, by the controller, a yaw rate required for the vehicle to steer to avoid the object;

obtaining, by the controller, a yaw moment required for partial braking on an inner wheel of the vehicle based on the driving speed of the vehicle, the yaw rate detected by the yaw rate detector, the determined yaw rate, and a yaw rate determined based on the detected steering angle, when generation of the determined yaw rate is impossible;

applying, by the controller, partial braking on the inner wheel of the vehicle based on the obtained yaw moment required for partial braking on the inner wheel;

obtaining, by the controller, a yaw moment required for partial braking on an outer wheel of the vehicle based on the driving speed of the vehicle, and the obtained beta value, when generation of the determined yaw rate is possible and a beta value of the vehicle obtained during the steering-based avoidance exceeds a predetermined value; and applying, by the controller, partial braking on the outer wheel of the vehicle based on the yaw moment required for partial braking on the outer wheel of the vehicle to reduce the beta value of the vehicle.

10. The method of claim 9, wherein the applying of the partial braking on the outer wheel of the vehicle includes:

stopping, by the controller, partial braking on the inner wheel of the vehicle when the beta value of the vehicle exceeds the predetermined value.

11. The method of claim 9, wherein the determining of the yaw rate required for the vehicle to steer to avoid the object includes:

calculating, by the controller, a yaw rate required for the vehicle to steer to avoid the object based on length of the vehicle, width of the vehicle, and coordinates of the position of the object, at which a distance between a steering-based avoidance path for the vehicle to steer to avoid the object and the object is minimized.

12. The method of claim 11, further comprising:

determining, by the controller, the coordinates of position of the object, at which a vertical distance to the steering-based avoidance path is minimized, based on position information of the object obtained by the detection sensor and the steering-based avoidance path of the vehicle.

13. The method of claim 9, wherein the applying of the partial braking on the inner wheel of the vehicle includes:

applying, by the controller, partial braking on the inner wheel of the vehicle with braking pressure determined based on the calculated yaw moment.

14. The method of claim 9, wherein the applying of the partial braking on the outer wheel of the vehicle includes:

applying, by the controller, partial braking on the outer wheel of the vehicle with braking pressure determined based on the calculated yaw moment.

* * * * *